Patented Aug. 21, 1928.

1,681,704

UNITED STATES PATENT OFFICE.

ROBERT J. MONTGOMERY, OF ROCHESTER, NEW YORK, ASSIGNOR TO BAUSCH & LOMB OPTICAL COMPANY.

OPTICAL GLASS.

No Drawing.   Application filed April 16, 1923. Serial No. 632,565.

The object of my invention is to provide an improved glass for optical purposes, particularly that used for ophthalmic lenses and which not only has a low index of refraction but has a high degree of absorption at the D line of the visible spectrum and cuts out, almost entirely, objectionable yellow light.

I have discovered that the addition of a quantity of commercial didymium oxide to an alkali silica glass mixture which contains no lime, or but a very small quantity of lime, produces a glass having the qualities mentioned, and I am enabled to control the optical properties, i. e., the refractive index, so that the index for the D line is reduced to 1.523, or thereabouts, thus rendering it suitable for practically all optical purposes and particularly for spectacle lenses. This result is obtained even when from 12 to 14% of commercial didymium oxide is used.

It is exceedingly difficult to determine the exact chemical formula of what is known as "commercial didymium oxide" which I have used with success. This material was obtained by me from the manufacturer, Lindsay Light Company of Chicago, Ill. and is stated to be largely didymia but contains small amounts of lanthanum, erbium, samarium and other rare earth metals. It is supposed that didymia is composed of about ⅔ neodymium and ⅓ praseodymium, and therefore it is impossible to give a formula that will exactly represent the material used.

A glass mixture found to be satisfactory has substantially the following composition:

|  | Per centum. |
|---|---|
| Silica | 69.5 |
| Sodium oxide | 15.8 |
| Boric oxide | .3 |
| Commercial didymium oxide | 12.0 |
| Antimony oxide | 1.9 |
| Arsenic oxide | .5 |

The index of refraction is controlled mainly by varying the didymium oxide and this may go as high as 15%. Potassium oxide might be substituted in part or as a whole for sodium oxide, and a combination such as is well known to glass makers could be used in which the boron oxide content might be increased and still hold the index at 1.523, or thereabouts, but lead oxide, barium oxide or calcium oxide cannot well be used in any large amounts and the refractive index held as low as 1.523.

The quantities of antimony oxide and arsenic oxide could be increased or diminished to control the melting properties.

The ingredients stated are mixed and melted in the usual way and the glass produced may be termed a sodium or potassium-didymium glass (in which boric acid may or may not be used) having an index of refraction which will not vary more than .0025 from 1.523, and absorbing the yellow rays in the D-line of the visible spectrum.

As it is oftentimes difficult to determine by analysis of glass the chemicals used in its formation, my invention not only comprehends the complete material but the composition of the batch or mix of which it is composed, and the process of making it.

I claim as my invention:

1. A glass mix or batch containing no lime and embodying from 12 to 14% of didymium oxide.

2. A glass mix or batch containing the following materials in substantially the proportions stated:

|  | Per centum. |
|---|---|
| Silica | 69.5 |
| Sodium oxide | 15.8 |
| Boric oxide | .3 |
| Commercial didymium oxide | 12.0 |
| Antimony oxide | 1.9 |
| Arsenic oxide | .5 |

ROBERT J. MONTGOMERY.